(12) United States Patent
Nonaka

(10) Patent No.: US 7,605,903 B2
(45) Date of Patent: Oct. 20, 2009

(54) METHOD FOR MANUFACTURING COLOR FILTER AND METHOD FOR MANUFACTURING LIQUID CRYSTAL DISPLAY DEVICE

(75) Inventor: Toshiyuki Nonaka, Shimosuwa (JP)

(73) Assignee: Seiko Epson Corporation (JP)

( * ) Notice: Subject to any disclaimer, the term of this patent is extended or adjusted under 35 U.S.C. 154(b) by 452 days.

(21) Appl. No.: 11/616,335

(22) Filed: Dec. 27, 2006

(65) Prior Publication Data

US 2007/0146617 A1  Jun. 28, 2007

(30) Foreign Application Priority Data

Dec. 27, 2005 (JP) ............... 2005-374473

(51) Int. Cl.
*G02F 1/1339* (2006.01)
*G02F 1/1337* (2006.01)

(52) U.S. Cl. .............. 349/187; 349/106; 349/129; 349/156

(58) Field of Classification Search ............ 349/106, 349/110, 129, 156, 157, 187; 359/891; 430/6, 430/7, 321
See application file for complete search history.

(56) References Cited

U.S. PATENT DOCUMENTS 6,850,309 B2    2/2005  Inoue et al.

2004/0070705 A1 *  4/2004  Kobayashi ............. 349/106
2004/0239853 A1 * 12/2004  Sakurada ............... 349/122
2005/0099581 A1    5/2005  Inoue et al.
2007/0139588 A1 *  6/2007  Nonaka et al. ......... 349/106

FOREIGN PATENT DOCUMENTS

| JP | 2001-117104 | * | 4/2001 |
| JP | 2003-035905 | * | 2/2003 |
| JP | 2003-058077 |   | 2/2003 |
| JP | 2003-075808 |   | 3/2003 |
| JP | 2005-121738 |   | 5/2005 |

* cited by examiner

*Primary Examiner*—Dung Nguyen
*Assistant Examiner*—Tai Duong
(74) *Attorney, Agent, or Firm*—Harness, Dickey & Pierce, P.L.C.

(57) ABSTRACT

A method of manufacturing a color filter substrate, including: forming a partition wall on a substrate; forming a display element on the substrate partitioned by the partition wall; forming an electrode on the surface of the partition wall and the display element; forming a liquid-repellent layer on the surface of the electrode; selectively forming a lyophilic region on the liquid-repellent layer by light irradiation; and forming a first protrusion and a second protrusion on the lyophilic region by a droplet ejection method.

6 Claims, 7 Drawing Sheets

METHOD FOR MANUFACTURING COLOR FILTER AND METHOD FOR MANUFACTURING LIQUID CRYSTAL DISPLAY DEVICE

BACKGROUND

1. Technical Field

The present invention relates to a method for manufacturing a color filter substrate and a method for manufacturing a vertical alignment type liquid crystal display device.

2. Related Art

On a vertical alignment type liquid crystal display device equipped with a color filter substrate and an element substrate, there are formed first protrusions to control the gap between the color filter substrate and the element substrate and second protrusions to generate alignment of a liquid crystal in a plurality of directions.

Various methods are employed for forming the first and second protrusions.

A method for forming the first protrusions is disclosed in, e.g., JP-A-2001-117104 (p. 5, FIG. 1), in which the first protrusions are formed by ejecting a curing spacer formation material by an inkjet method which is one of droplet ejection methods and then by curing the curing spacer formation material using light irradiation, thermal treatment, or both light irradiation and thermal treatment.

Further, a method for forming the second protrusions is disclosed in, e.g., JP-A-2003-35905 (p. 4, FIG. 1), in which protrusions that become the second protrusions are formed on the color filter substrate side through patterning by photolithography using photosensitive resin When forming the first protrusions using the droplet ejection method, the positional accuracy of the first protrusions depends on the positional accuracy of the droplets ejected onto the color filter substrate. Therefore, there is a problem that the first protrusions are formed at positions where they shield display elements, and the display quality becomes degraded depending on the positional accuracy of the ejected droplets.

Further, when forming the second protrusions by photolithography, the manufacturing process becomes complex. When forming, instead, the second protrusions by the droplet ejection method, a problem is that it is difficult to form fine second protrusions smaller than the diameter of the droplets.

SUMMARY

An advantage of the invention is to provide a method of manufacturing a color filter substrate and a liquid crystal device manufacturing method, by which the first protrusions and the fine second protrusions can be formed with high positional accuracy.

According to one aspect of the invention, a method of manufacturing a color filter substrate includes: forming a partition wall on a substrate; forming a display element on the substrate partitioned by the partition wall; forming an electrode on the surface of the partition wall and the display element; forming a liquid-repellent layer on the surface of the electrode; selectively forming a lyophilic region on the liquid-repellent layer by light irradiation; and forming a first protrusion and a second protrusion on the lyophilic region by a droplet ejection method.

In this case, because the lyophilic regions used to form the first and second protrusions are formed in advance on the liquid-repellant layer by light irradiation, the ejected droplets may move in such a manner that they are pulled to the lyophilic regions even if they land slightly off the positions where the first and second protrusions are to be formed depending on the positional accuracy of the droplet ejection. Therefore, the first and second protrusions may be formed at the targeted positions.

It is preferable that, in the method of manufacturing a color filter substrate, a droplet containing a material for forming the first protrusion and a droplet containing a material of the second protrusion be ejected in correspondence with each region for forming the first and second protrusions while a droplet ejection unit using the droplet ejection method scans on the color filter substrate one time.

In this case, separate ejections are possible during one scan, and the process may be simplified. Further, productivity and yield may increase.

It is preferable that, in the method of manufacturing a color filter substrate, the droplet containing the material for forming the first protrusion be larger than the droplet containing the material for forming the second protrusion.

The first protrusions that control the gap between the color filter substrate and the element substrate must be formed larger (higher) than the second protrusions that control the alignment of the liquid crystal. According to the aspect of the invention, since the protrusions are formed by the droplet ejection method, it is possible to readily form the first and second protrusions by ejecting large droplets to the first protrusion formation regions and small droplets to the second protrusion formation regions during one scan of the droplet ejection unit. This means that unnecessary repetition of the ejection to the first protrusion formation regions may be omitted and that the process may be greatly simplified.

It is preferable that, in the method of manufacturing a color filter substrate, the display element be formed by a droplet ejection method.

In this case, if the display elements are formed by the droplet ejection method, it may become unnecessary to use a large-scale facility to correspond with a large-sized substrate required in the formation using photolithography. At the same time, many time-consuming processes such as exposure, developing, and cleaning may be omitted, and, thus, the process may be greatly simplified.

Further, it is preferable that, in the method of manufacturing a color filter substrate, the partition wall be formed by a droplet ejection method.

In this case, if the partition walls are formed by the droplet ejection method, it may become unnecessary to use a large-scale facility to correspond with a large-sized substrate required in the formation using photolithography. At the same time, many time-consuming processes such as exposure, developing, and cleaning may be omitted, and, thus, the process may be greatly simplified.

According to another aspect of the invention, a method of manufacturing a liquid crystal display device includes: controlling a gap between the color filter substrate and an element substrate by use of the first protrusion of the color filter substrate manufactured by the method of manufacturing a color filter substrate of the first aspect of the invention and then sealing to form a liquid crystal filling layer.

In this case, it is possible to provide the method of manufacturing a liquid crystal display device having the aforementioned effects.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will now be described in accordance with the drawings.

FIGS. 1A, 1B, 2A, and 2B show a liquid crystal display device 1 of one embodiment.

Figure 1A:
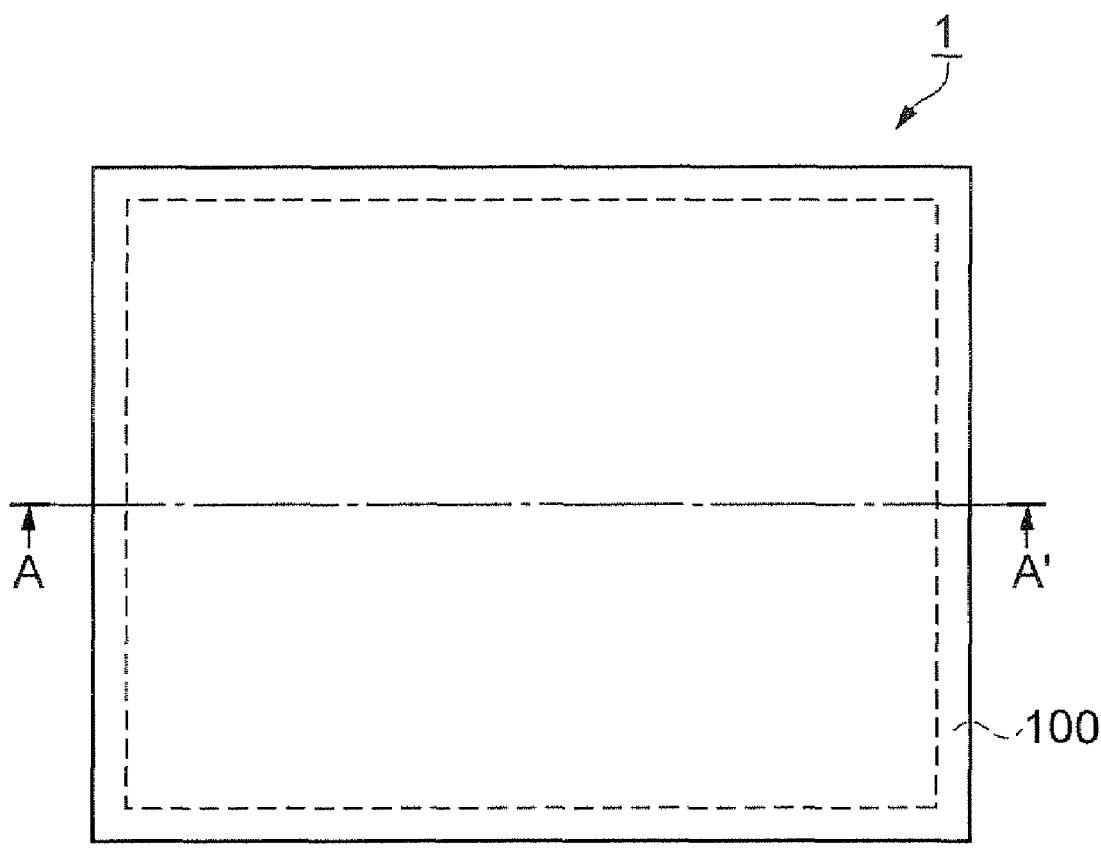
FIG. 1A is a schematic plan view of a liquid crystal display device according to an embodiment of the invention.
Figure 1B:
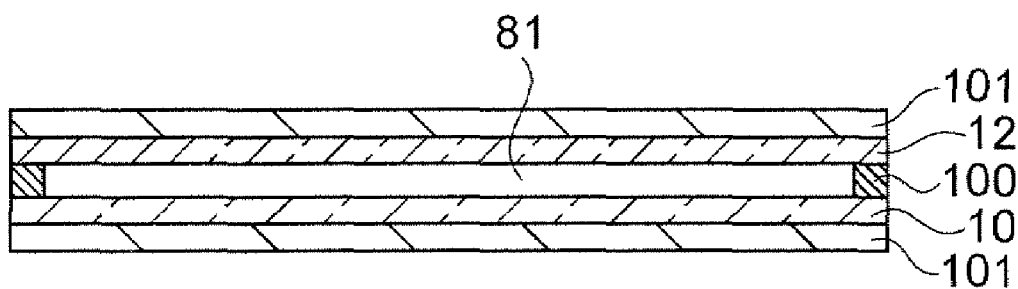
FIG. 1B is a cross section of FIG. 1A taken on A-A'.

FIG. 1A is a schematic plan view of the liquid crystal display device 1 of the present embodiment, and FIG. 1B is a cross section of FIG. 1A taken on A-A'.

In FIGS. 1A and 1B, the liquid crystal display device 1 includes a color filter substrate 10, an element substrate 12, liquid crystal 81, a seal 100, and polarizing plates 101.

The color filter substrate 10 and the element substrate 12 are arranged opposite from each other, and the peripheries of the color filter substrate 10 and the element substrate 12 are sealed by the seal 100. The liquid crystal 81 is formed at a portion surrounded by the color filter substrate 10, the element substrate 12, and the seal 100. The polarizing plates 101 are each arranged outside the color filter substrate 10 and the element substrate 12.

Figure 2A:
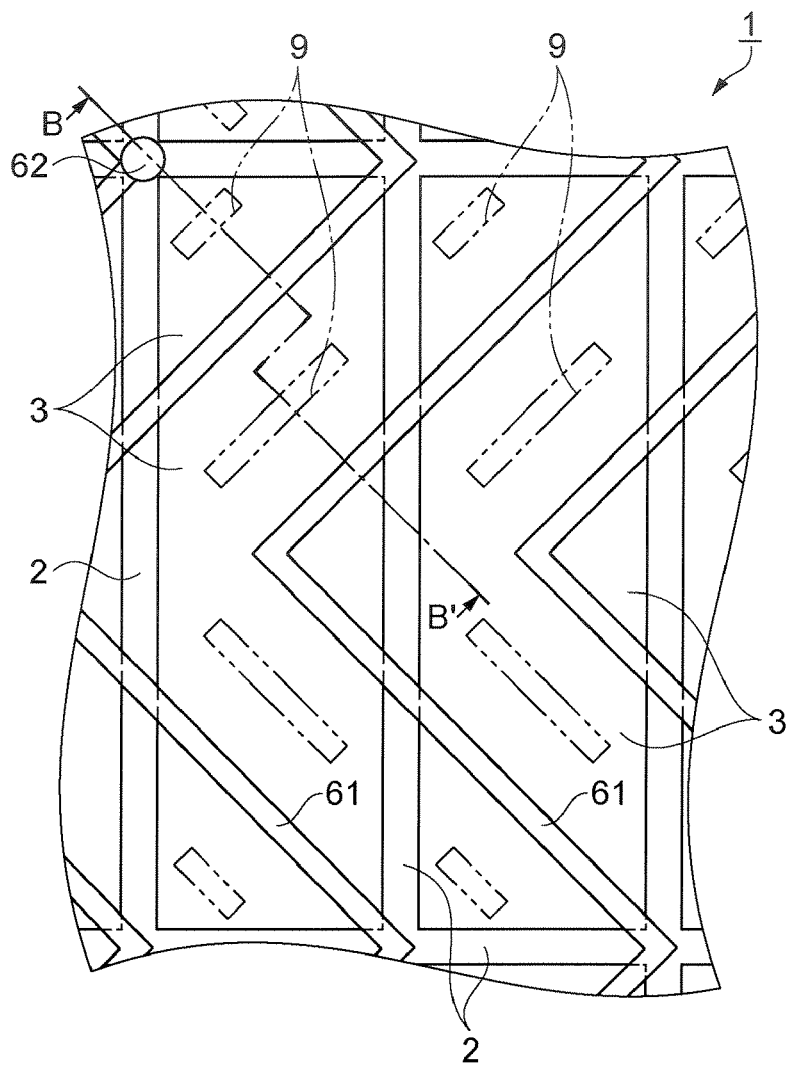
FIG. 2A is an enlarged schematic plan view of the liquid crystal display device.
Figure 2B:
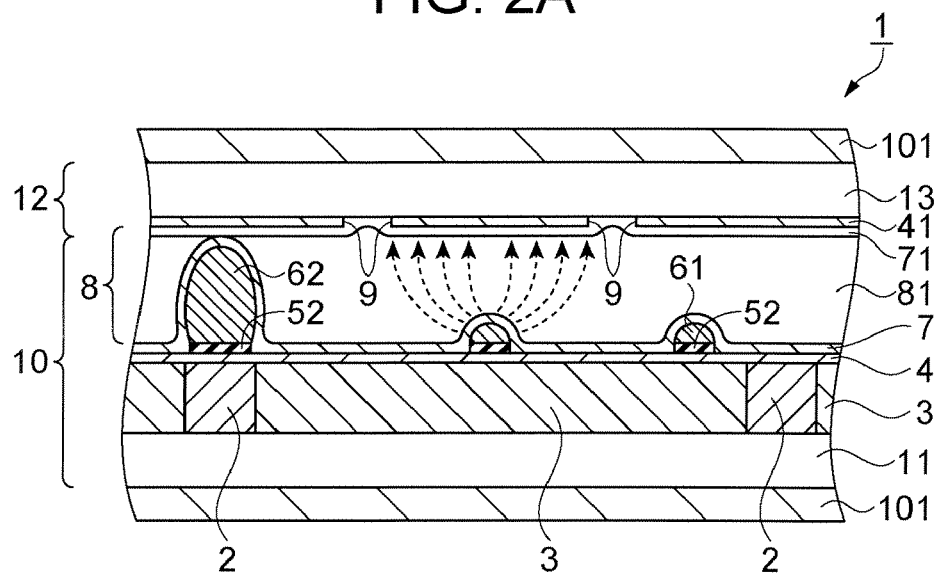
FIG. 2B is a cross section of FIG. 2A taken on B-B'.

FIG. 2A is an enlarged schematic plan view of a part of the liquid crystal display device 1, and FIG. 2B is a cross section of FIG. 2A taken on B-B'.

In FIGS. 2A and 2B, the color filter substrate 10 includes a substrate 11, partition walls 2, display elements 3, an electrode 4, second protrusions 61, first protrusions 62, alignment film 7, and lyophilic regions 52.

The partition walls 2 are formed on the substrate 11. The display elements 3 are formed on the substrate 11 partitioned by the partition walls 2. Each group of display elements 3 having different colors constitutes a pixel. The color filter substrate 10 includes a plurality of pixels.

Also, the electrode 4 is formed on the surface of the partition walls 2 and the display elements 3. The lyophilic regions 52 and the second protrusions 61 are formed on the surface of the electrode 4.

Further, at portions above the partition walls 2 on the electrode 4, the lyophilic regions 52 and the first protrusions 62 are formed. Then, the alignment film 7 is formed thereon.

In FIG. 2B, the element substrate 12 includes a substrate 13, electrodes 41, alignment film 71, and slits 9.

The electrodes 41 are formed on the substrate 13. The alignment film 71 is formed on the surface of the electrodes 41.

In this case, the plurality of slits 9 are formed to finely divide the electrodes 41 and the alignment film 71 so that the alignment of the liquid crystal as indicated by the dotted arrows in the drawing is generated upon application of different voltages to the electrodes 41 and 4.

In the following, the positional relation between the second protrusions 61 and the slits 9 will be described.

As shown in FIG. 2A, the second protrusions 61 are arranged substantially between the slits 9 shown in the paralleling two-dot chain lines in the drawing.

The second protrusion 61 extends upward at substantially 45 degrees from the right end of one lower side of the display element 3 and, also, extends downward at substantially 45 degrees from the right end of one upper side of the display element 3. The second protrusions 61 extend up to a position where they intersect with each other. The second protrusions 61 do not necessarily extend from the corner but from anywhere of the display element 3. Also, the second protrusions 61 may be formed only on the display elements 3 and not on the partition walls 2.

As shown in FIG. 2A, because the second protrusions 61 and the slits 9 are formed as they extend upward and downward at substantially 45 degrees to the display elements 3, the alignment of liquid crystal takes place in a plurality of directions as indicated by the dotted arrows in FIG. 2B. As a consequence, the view angle of the liquid crystal display device 1 widens.

FIGS. 3 through 6 are schematic cross sections showing the processes for manufacturing the color filter substrate 10, the element substrate 12, and the liquid crystal display device 1.

Descriptions of the process for manufacturing the color filter substrate 10 are as follows.

Figure 3A:
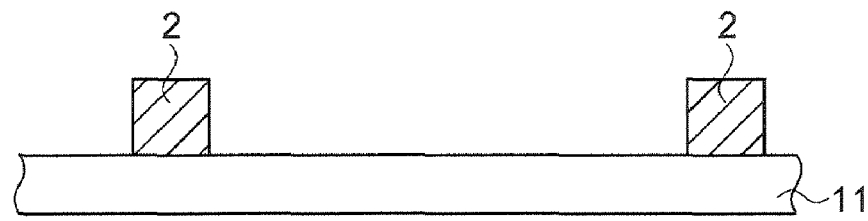
FIGS. 3A through 3C are schematic cross sections showing the first half of the process for manufacturing a color filter substrate.
Figure 3B:
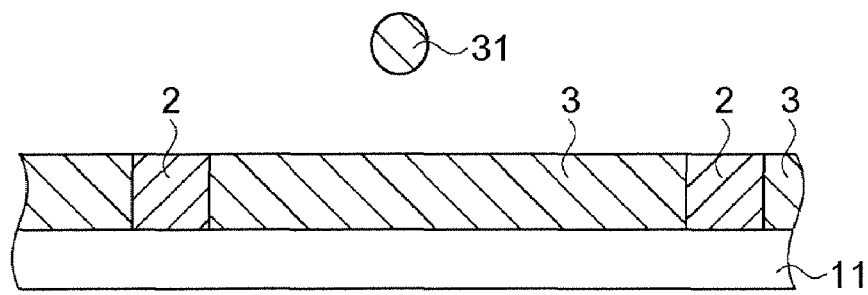
Figure 3C:
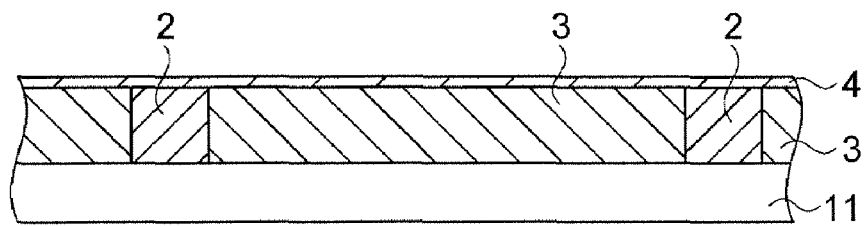

FIGS. 3A through 3C are schematic cross sections showing the first half of the process for manufacturing the color filter substrate 10.

FIGS. 4D through 4H are schematic cross sections showing the last half of the process for manufacturing the color filter substrate 10.

FIG. 3A shows a partition wall formation process. FIG. 3B shows a display element formation process. FIG. 3C shows an electrode formation process.

As shown in FIG. 3A, the partition walls 2 are formed on the substrate 11. The partition walls 2 are formed by etching a applied and cured phenol resin through photolithography.

The method for forming the partition walls 2 is not limited to photolithography. For example, the partition walls 2 may be formed by a droplet ejection method, followed by a curing treatment. In the drawing, the cross-sectional configuration of the partition wall 2 is expressed as rectangular; however, the configuration may be suitably decided depending on the formation method, curing method, material, and so forth.

The material of the partition walls 2 may not be limited to phenol resin but may be a polymeric material such as acryl resin, polyimide resin, olephin resin, or melanin resin.

The material of the substrate 11 may also vary, such as glass, quartz glass, Si wafer, plastic film, metal plate, or ceramic. Further, semiconductor film, metal film, dielectric film, organic film, or insulating film that forms a base layer on the surface of these various types of substrates may be used.

In addition, in the embodiment, because the partition walls 2 are composed of a shielding material, they not only act as partition walls 2 partitioning the display element 3 but also as a shielding layer shielding a portion not including the display elements 3.

Next, as shown in FIG. 3B, a display element material 31 of each color containing coloring agents such as pigments or dyes is ejected by the droplet ejection method on the substrate 11 which is partitioned by the partition walls 2. Thereafter, the display element material 31 is cured so as to form the display element 3 for each color.

The ejection amount, solvent content, or viscosity of the display element material 31 may suitably be decided so that the display element material 31 does not exceed the partition walls 2, that the material 31 does not flow into the adjacent display elements 3, and that the surface thereof after the curing treatment levels substantially with the upper surface of the partition walls 2.

Further, the temperature of this curing treatment may suitably be decided in accordance with the composition or the like of the display element material 31. The curing treatment is not limited to a thermal treatment but may, for example, be a photo treatment or a combination of both thermal and photo treatments.

Furthermore, although the curing is normally conducted in the atmosphere, it may be conducted in an atmosphere of inert gas such as nitrogen, argon, and helium or in a reducing atmosphere of, e.g., hydrogen.

The curing treatment temperature may be suitably decided by such measures as the vapor pressure of the dispersing medium, the type and pressure of the atmospheric gas, the thermal behavior of the microparticles such as dispersiveness and oxidation, whether or not a coating material is present and, if present, the amount of the coating material, and the heat resistance temperature of the base material.

There are various ejection techniques in the droplet ejection method. However, an inkjet method is preferable, since it enables formation of fine, on-demand wiring pattern. The inkjet method may be, for example, an electrification control method, pressurized vibration method, electromechanical transduction method, electrothermal transduction method, or an electrostatic attraction method. The electrification control method is such that the material is charged by an electrification electrode and ejected from an ejection nozzle while controlling the flying directions of the material using a deflection electrode. Further, the pressurized vibration method is such that a super high pressure of about 30 kg/cm$^2$ is applied to the material to make an ejection nozzle tip to eject the material, and that, when a control voltage is not applied, the material is ejected straight from the ejection nozzle, and, when the control voltage is applied, the material experiences an electrostatic reaction and scatters without being ejected from the ejection nozzle. Furthermore, the electromechanical transduction method, which takes advantage of the characteristics of a piezoelectric element to deform upon receipt of a pulse-like electric signal, is such that, by deforming the piezoelectric element, a pressure is applied via a flexible material to a chamber storing the material, and that the material is pushed out of the chamber and ejected from the ejection nozzle.

Next, as shown in FIG. 3C, the electrode 4 is formed on the surface of the partition walls 2 and the display elements 3.

The electrode 4 is normally formed by sputtering indium tin oxide (ITO). It may be formed not necessarily by sputtering but by photolithography, vacuum vapor-deposition, or a pyrosol method.

Further, the material of the electrode 4 is not limited to ITO but may be, e.g., tin oxide or a composite oxide of indium oxide and zinc oxide.

Hereafter, the last half of the process for manufacturing the color filter substrate 10 will be described.

Figure 4D:
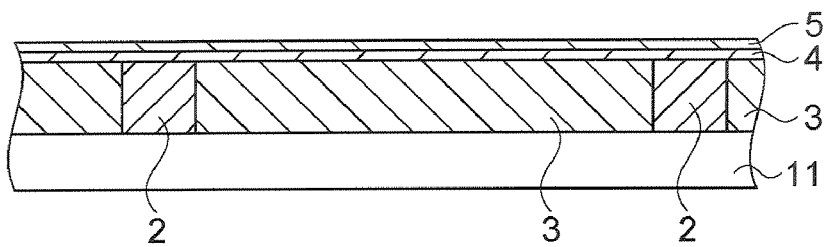
FIGS. 4D through 4H are schematic cross sections showing the last half of the process for manufacturing the color filter substrate.
Figure 4E:
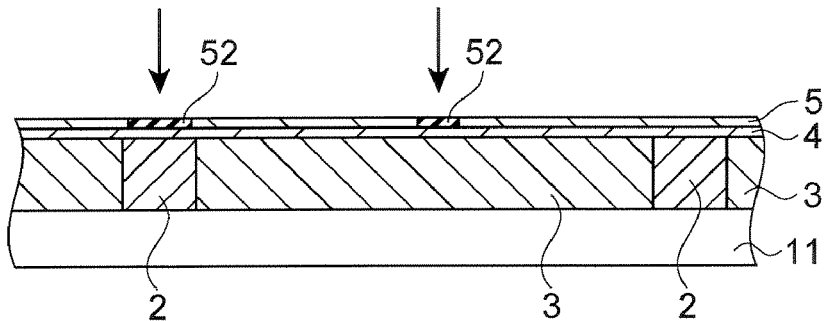
Figure 4F:
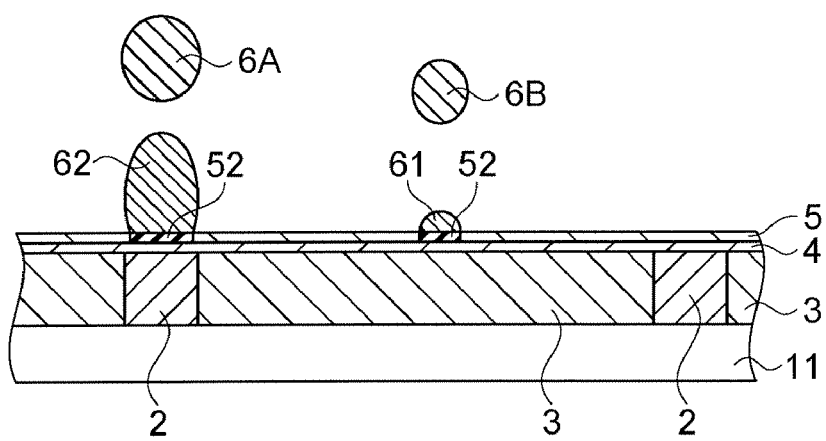
Figure 4G:
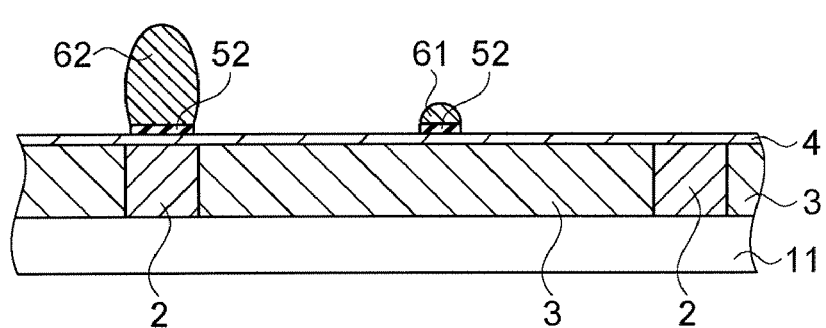
Figure 4H:
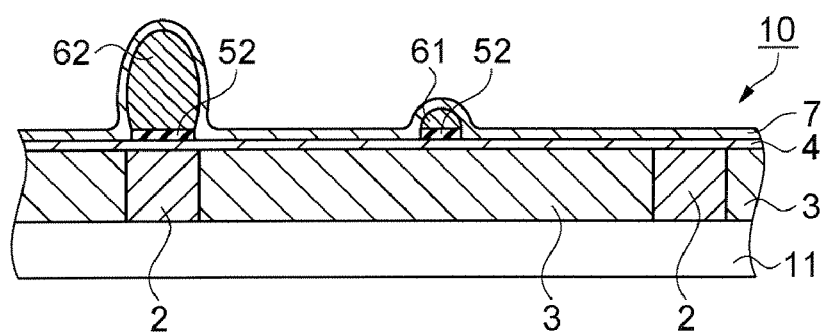

FIG. 4D shows a liquid repellent treatment process. FIG. 4E shows a lyophilization process. FIG. 4F shows a protrusion formation process. FIG. 4G shows a process for removing a liquid repellent treatment layer. FIG. 4H shows an alignment film formation process.

As shown in FIG. 4D, a liquid-repellent treatment layer 5 composed of alkylsilane fluoride (hereinafter referred to as FAS), hexamethyl disilane (hereinafter referred to as HMDS), or the like is formed by vapor-phase growth.

However, the method of the liquid-repellent treatment is not limited to the vapor-phase growth but may use a self-assembled monolayer formation method. In the self-assembled monolayer formation method, a self-assembled monolayer composed of, e.g., organic molecular film is formed.

The organic molecular film used for the self-assembled monolayer contains: a functional group that can be combined with the film formation surface, a functional group such as a lyophilic group or a liquid repellent group that changes the surface properties, and a straight or partially branched carbon chain to combine these functional groups. Such an organic molecular film is combined with the film formation surface to form the self-assembled molecular layer.

The self-assembled monolayer is formed by assembling monomolecules and can be made extremely thin and uniform on the molecular level.

Next, the surface of the liquid-repellent treatment layer 5 where the first and second protrusions 62 and 62 are to be formed is selectively irradiated with light such as laser as shown by the arrows in FIG. 4E. By modifying the surface of the liquid-repellent treatment layer 5 at the irradiated regions, the lyophilic regions 52 whose sizes correspond to the sizes of the first and second protrusions 62 and 61 are formed.

The conditions of the light irradiation, such as light strength and irradiation time, may be suitably adjusted to suit the material for forming the liquid-repellent treatment layer 5 and the thickness of the material so that the surface of the liquid-repellent treatment layer 5 becomes lyophilic.

Further, the light used for the irradiation may be, for example, Nb:YAG laser (1.064 μm) or $CO_2$ laser (10.6 μm).

Further, the method for lyophilizing the thin film composed of FAS or the like may also include a method in which a region not including the lyophilizing region is covered by a mask and irradiated with ultraviolet light (UV).

Hereafter, the principles of the lyophilization of the surface of the liquid-repellent treatment layer 5 by the light irradiation will be described.

When the surface of the liquid-repellent treatment layer 5 is irradiated with light, fluoro groups or hydrocarbon groups in the irradiated region are removed, and hydroxyl groups are formed. In other words, the light irradiation enables lyophilization of the surface of the liquid-repellent treatment layer 5 and formation of the lyophilic regions 52.

Next, as shown in FIG. 4F, the first and second protrusions 62 and 61 are formed at the lyophilic regions 52 while controlling the ejection amount of each of droplets 6A and 6B by the droplet ejection method.

More specifically, a large droplet 6A is ejected to the lyophilic region 52 on the partition wall 2 that acts also as the shielding layer so as to form the first protrusion 62. Then, a small droplet 6B is ejected to the lyophilic region 52 on the partition wall 2 and the display element 3 so as to form the fine second protrusion 61. In this case, the droplet 6B may be slightly larger than the lyophilic region 52 that corresponds to the second protrusion 61.

In the embodiment, since the first and second protrusions 62 and 61 are formed by the droplet ejection method, it is possible to simultaneously form the first and second protrusions by controlling the position and amount of the ejecting droplets while the droplet ejection head as the droplet ejection unit moves, that is scans, on the color filter substrate one time.

To form the droplets 6A and 6B, light-curing acrylic resin is used, and it is cured by photo treatment.

The material of the droplets 6A and 6B is not limited to the light-curing acrylic resin but may be any material so long as it contains a curing component, can be ejected by use of the droplet ejection method, and can be cured in an after-treatment.

Further, the quantity of the first protrusions 62 may be suitably decided so that the gap between the color filter substrate 10 and the element substrate 12 becomes uniform.

The position for forming the first protrusions 62 is not limited to a particular position so long as it is on the partition wall 2 acting also as the shielding layer.

The height of the first protrusions 62 is such that the element substrate 12 does not come in contact with the second protrusions 61 when disposing the element substrate 12. For example, the height is preferably between 1.5 μm and 2.5 μm from the electrode 4. If the height of the first protrusions 62 is 1.5 μm or more, the liquid crystal 81 can be disposed between the first protrusions 61 and the element substrate 12, and it becomes possible to generate the liquid crystal alignment as indicated by the dotted lines in FIG. 2B and to maintain the display quality. If the height is 2.5 μm or less, the liquid crystal can be aligned at a low voltage, and fast response speed can be maintained.

The height, width, and cross-sectional configuration of the first protrusions 62 may be suitably decided by the composition and the like of the droplets 6A and 6B.

It is preferable that the height of the second protrusions 61 be between 0.5 μm and 1 μm from the electrode 4, and the width thereof be between 5 μm and 10 μm.

If the height is 0.5 μm or more, the liquid crystal alignment as indicated by the dotted lines in FIG. 2B can take place upon application of a different voltage to each of the electrodes 4 and 41. Further, if the height is 1 μm or less, the liquid crystal 81 can be disposed between the second protrusions 61 and the element substrate 12 and can have such an alignment as indicated by the dotted lines in FIG. 2B, and the view angle can be widened.

If the width is 5 μm or more, the liquid crystal alignment as indicated by the dotted lines in FIG. 2B can occur. If the width is 10 μm or less, it is possible to widen the angle of the liquid crystal alignment as indicated by the dotted lines in FIG. 2B and, thus, to widen the view angle.

The cross section of the second protrusion 61 preferably has a half-circular or curved surface configuration. If it has the half-circular or curved surface configuration, it becomes possible to gradually change the liquid crystal alignment as indicated by the dotted lines in FIG. 2B and to evenly widen the view angle.

The curing treatment of the first and second protrusions 62 and 61 is not limited to the thermal treatment but may be, for example, the photo treatment or combination of both photo and thermal treatments.

Next, as shown in FIG. 4G, the liquid-repellent treatment layer 5 is removed.

In the embodiment, a hydrofluoric acid process is conducted to remove the liquid-repellent treatment layer 5.

For example, an etching using a 2.5% aqueous hydrofluoric acid solution is conducted. By carrying out this hydrofluoric acid process, the liquid-repellent treatment layer 5 is removed.

There is a case in which the hydrofluoric acid process does not completely remove the liquid-repellent treatment layer 5 and leaves the residues. Therefore, in order to remove the residues, a residue removal process is next conducted.

For the residue removal process, either an ultraviolet irradiation process in which the residues are removed by ultraviolet irradiation or an $O_2$ plasma treatment in which the residues are removed in the atmosphere using oxygen as the treatment gas may be selected. In the embodiment, the $O_2$ plasma treatment is conducted.

In the $O_2$ plasma treatment, the electrode 4 after the liquid-repellent treatment layer 5 has been removed is irradiated with oxygen in a plasma state from a plasma discharge electrode. The conditions of the $O_2$ plasma treatment are: the plasma power is 50-100 W; the amount of oxygen gas flow is 50-100 mL/min; the relative speed of the substrate 11 to the plasma discharge electrode is 0.5-10 mm/; and the temperature of the substrate 11 is 70-90° C., for example.

In the embodiment, the hydrofluoric acid process as a part of the liquid-repellent treatment layer removal process has been explained. However, if the liquid-repellent treatment layer 5 on the substrate 11 not including the second and first protrusions 61 and 62 is sufficiently removed by either the $O_2$ plasma treatment or the ultraviolet irradiation process, the hydrofluoric acid process may not be performed. Also, although it has been explained that either one of the $O_2$ plasma treatment or the ultraviolet irradiation process is conducted for the liquid-repellent treatment layer removal process, the $O_2$ plasma and ultraviolet irradiation processes may certainly be conducted in combination.

Next, as shown in FIG. 4H, the alignment film 7 is formed on the electrode 4, the second protrusions 61, and the first protrusions 62.

The alignment film 7 may be composed of an organic compound such as a soluble polyimide or a polyamic acid type polyimide, for example.

Hereinabove, the method for manufacturing the color filter substrate 10 has been described.

Now, the process for manufacturing the element substrate 12 and the liquid crystal display device 1 will be described.

Figure 5A:
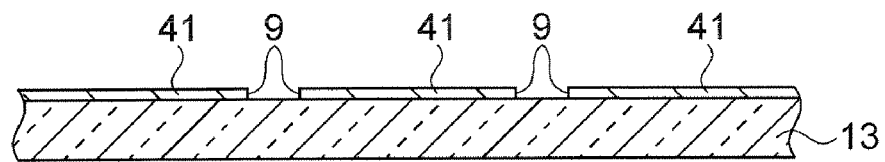
FIGS. 5A and 5B are schematic cross sections showing a process for manufacturing an element substrate.
Figure 5B:
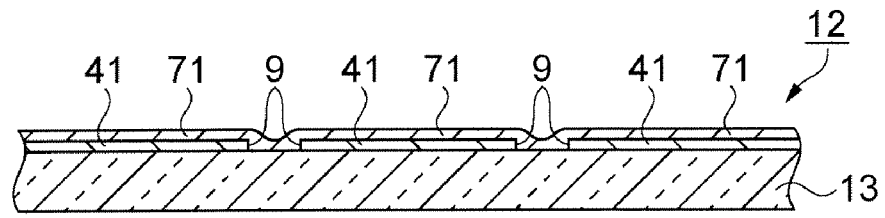

FIGS. 5A and 5B are schematic cross sections showing the process for manufacturing the element substrate 12.

Figure 6A:
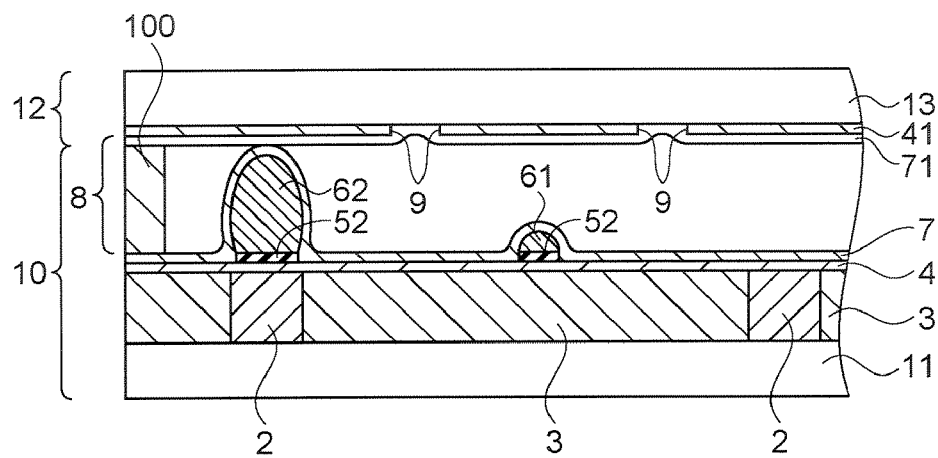
FIGS. 6A through 6C are schematic cross sections showing a process for manufacturing the liquid crystal display device.
Figure 6B:
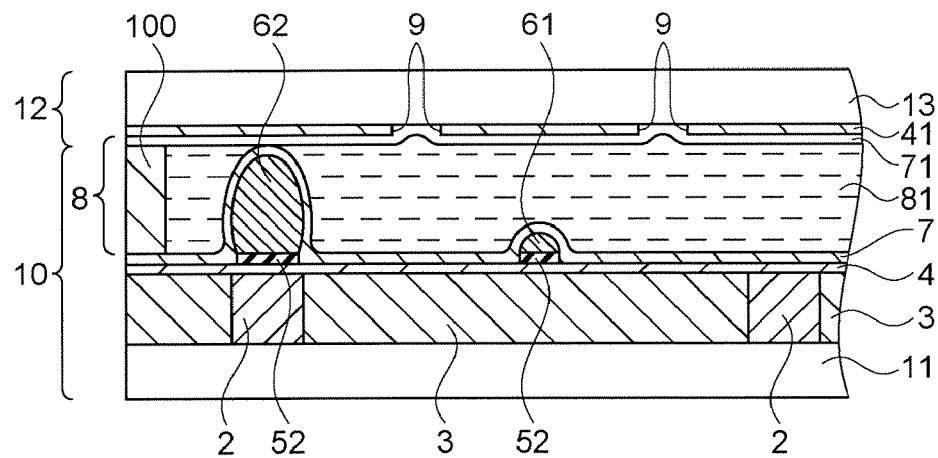
Figure 6C:
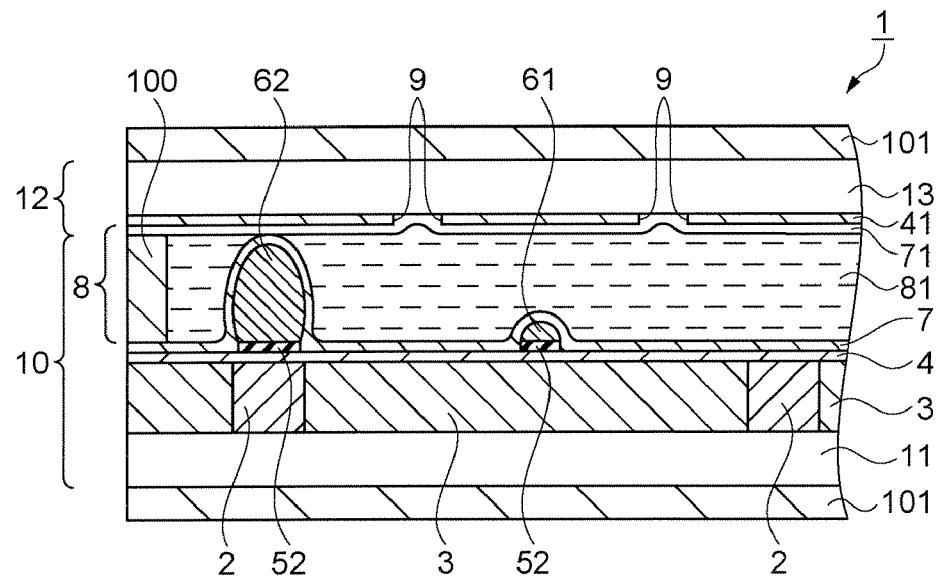

FIGS. 6A through 6C are schematic cross sections showing the process for manufacturing the liquid crystal display device 1.

FIG. 5A shows an electrode formation process on the element substrate side. FIG. 5B shows an alignment film formation process on the element substrate side.

As shown in FIG. 5A, the electrode 41 is formed on the substrate 13 by sputtering. On the substrate 13, a plurality of regions at which the electrodes 41 are not formed are formed so as to form the plurality of slits 9. In this case, as has been shown in FIG. 2A, the slits 9 are formed substantially between the two paralleling second protrusions 61. Although the slits 9 are illustrated as rectangular, the shape may be suitably decided depending on the formation method and the material.

The method for forming the electrodes 41 is not limited to sputtering and may use photolithography, vapor deposition, or a pyrosol method, for example.

Further, the material of the electrodes 41 may be ITO, tin oxide, indium oxide, or a composite oxide of indium oxide and zinc oxide.

As shown in FIG. 5B, the alignment film 71 is formed on the surface of the electrodes 41.

Similarly to the alignment film 7, the alignment film 71 may also be composed of an organic compound such as a soluble polyimide or a polyamic acid type polyimide.

FIG. 6A shows a sealing process. FIG. 6B shows a liquid crystal filling process. FIG. 6C shows a polarizing plate deposition process.

As shown in FIG. 6A, the color filter substrate 10 and the element substrate 12 are arranged opposite from each other. The first protrusions 62 create a gap between the color filter substrate 10 and the element substrate 12, and the peripheries of the color filter substrate 10 and the element substrate 12 are sealed by the seal 100 to form a liquid crystal filling layer 8.

Next, as shown in FIG. 6B, the liquid crystal 81 is filled into the liquid crystal filling layer 8 and sealed.

As shown in FIG. 6C, the polarizing plates 101 are each arranged outside the color filter substrate 10 and the element substrate 12.

Hereafter, the effects of the embodiment will be described.

1. Because the lyophilic regions 52 used to form the first and second protrusions 62 and 61 are formed by the light irradiation in advance on the liquid-repellant treatment layer 5, the ejected droplets 6A and 6B move in such a manner that they are pulled to the lyophilic regions even if they land slightly off the positions where the first and second protrusions are to be formed depending on the positional accuracy of the droplet ejection. Therefore, the first and second protrusions 62 and 61 can be formed at the targeted positions.

Also, even if the droplets 6B larger than the second protrusions 61 land in the lyophilic regions 52 where the second protrusions 61 are to be formed, the droplets 6B become pulled to the lyophilic regions 52 and fit therein. In this case, because the lyophilic regions 52 are formed in accordance with the size of the second protrusions 61, the second protrusions 61 can be formed smaller and finer than the diameter of the droplet 6B.

2. Because the first protrusions 62 having the stable size and height can be formed, it is possible to make the thickness of the liquid crystal filling layer 8 to be uniform and to eliminate display unevenness. Moreover, because the second protrusions 61 having the stable size and height can be formed, it is possible to make the alignment control to be uniform, to widen the view angle, and to equalize the brightness.

3. The process can be simplified by controlling the ejection position and amount of the droplets 6A and 6B so as to perform the ejection separately to the first and second protrusions 62 and 61 during the same one scan. In addition, the productivity and yield can increase.

4. It is possible to provide the method for manufacturing the liquid crystal display device 1 having the aforementioned effects.

It is to be noted the invention is not limited to the above-described embodiments but may include modifications and improvements provided that the effects of the invention can be achieved.

In the following, a modified working example pertaining to the liquid-repellent treatment and lyophilization of the above-described embodiment.

MODIFIED WORKING EXAMPLE

Figure 7:
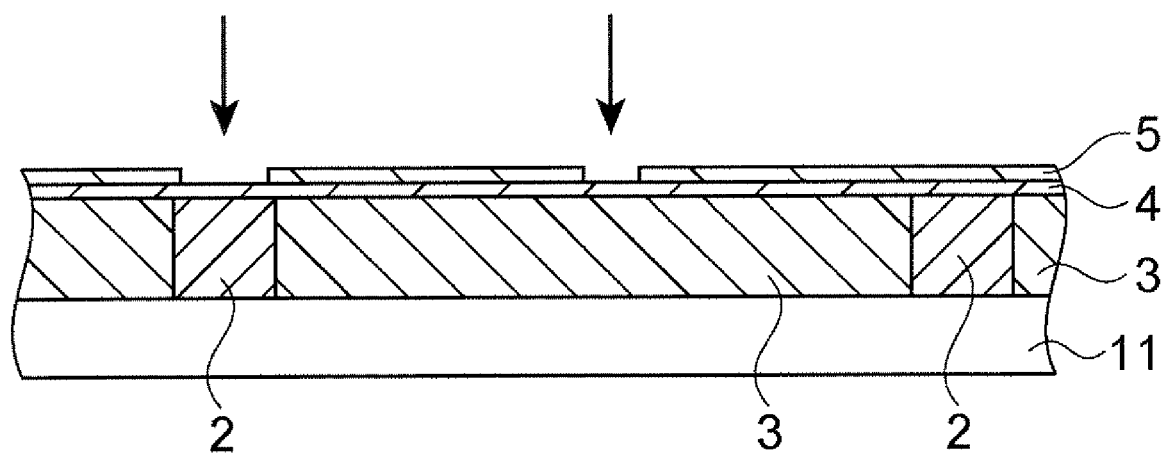
FIG. 7 is a schematic cross section showing a lyophilization process of a modified working example.

In the lyophilization method in the above-described embodiments, as shown in FIG. 7, the laser strength and the irradiation spot diameter may be suitably selected, the liquid-repellent treatment layer 5 may be selectively removed by a laser etch; and the first and second protrusions 62 and 61 may be formed directly on the surface of the electrode 4.

Further, the liquid-repellent treatment layer 5 may be formed by coating with photosensitive fluororesin instead of by the liquid-repellent treatment using FAS or HDMS. The conditions of the laser beam irradiation, such as laser beam strength and irradiation time, may be then suitably adjusted in accordance with the material and thickness of the forming liquid-repellent treatment layer 5 so that a part of the surface of the liquid-repellent treatment layer 5 becomes lyophilic. The lyophilization principles are the same as those described hereinbefore.

It is to be noted that, although the preferred methods of the embodiments of the invention are disclosed in the descriptions hereinbefore, the embodiments of the invention are not limited to these descriptions. This means that, although the embodiments of the invention are described with respect mainly to particular working examples, various modifications to the embodiments may be made by those skilled in the art, such as the materials to be used, structures, manufacturing methods, process times, and other details, provided that the modifications do not deviate from the technical ideas and objects of the present invention.

Accordingly, since the descriptions defining the materials, structures, manufacturing methods, and the like as disclosed herein are shown as examples to make the invention easily understandable and not to limit the embodiments of the invention, any other written statements partially or totally redefining the materials, structures, manufacturing methods, and the like that are not described herein shall be included in the present invention.

The entire disclosure of Japanese Patent Application No. 2005-374473, filed Dec. 27, 2005 is expressly incorporated by reference herein.

What is claimed is:

1. A method of manufacturing a color filter substrate, comprising:
    forming a partition wall on a substrate;
    forming a display element on the substrate partitioned by the partition wall;
    forming an electrode on the surface of the partition wall and the display element;
    forming a liquid-repellent layer on the surface of the electrode;
    selectively forming a lyophilic region on the liquid-repellent layer by light irradiation; and
    forming a first protrusion and a second protrusion on the lyophilic region by a droplet ejection method.

2. The method of manufacturing a color filter substrate according to claim 1, wherein a droplet containing a material for forming the first protrusion and a droplet containing a material for forming the second protrusion are ejected in correspondence with each region for forming the first and second protrusions while a droplet ejection unit using the droplet ejection method scans on the color filter substrate one time.

3. The method of manufacturing a color filter substrate according to claim 1, wherein the droplet containing the material for forming the first protrusion is larger than the droplet containing the material for forming the second protrusion.

4. The method of manufacturing a color filter substrate according to claim 1, wherein the display element is formed by a droplet ejection method.

5. The method of manufacturing a color filter substrate according to claim 1, wherein the partition wall is formed by a droplet ejection method.

6. A method of manufacturing a liquid crystal display device, comprising:
    controlling a gap between the color filter substrate and an element substrate by use of the first protrusion of the color filter substrate manufactured by the method of manufacturing a color filter substrate of claim 1; and
    sealing to form a liquid crystal filling layer.

* * * * *